United States Patent [19]

Deller et al.

[11] Patent Number: 5,015,615

[45] Date of Patent: May 14, 1991

[54] MOLDED ARTICLES BASED ON PYROGENICALLY PREPARED ALUMINUM OXIDE AND PROCESS FOR THEIR PRODUCTION

[75] Inventors: Klaus Deller, Hainburg; Rainhard Klingel, Alzenau; Helmfried Krause, Rodenbach, all of Fed. Rep. of Germany

[73] Assignee: Degussa Aktiengesellschaft, Frankfurt am Main, Fed. Rep. of Germany

[21] Appl. No.: 492,397

[22] Filed: Mar. 7, 1990

Related U.S. Application Data

[63] Continuation of Ser. No. 308,124, Feb. 9, 1989, abandoned.

[30] Foreign Application Priority Data

Feb. 9, 1988 [DE] Fed. Rep. of Germany ....... 3803897

[51] Int. Cl.$^5$ ..................... B01J 21/04; B01J 21/12; B01J 32/00
[52] U.S. Cl. ..................... 502/263; 502/355; 502/439
[58] Field of Search ..................... 502/263, 355, 439

[56] References Cited

U.S. PATENT DOCUMENTS 3,146,210 8/1964 Baldwin ........................ 502/263 X
4,169,874 10/1979 Bambrick ..................... 502/355 X
4,444,899 4/1984 Yamada et al. ................ 502/263 X
4,766,101 8/1988 Nortier et al. ................. 502/263 X Primary Examiner—W. J. Shine
Attorney, Agent, or Firm—Beveridge, DeGrandi & Weilacher

[57] ABSTRACT

Molded articles based on pyrogenically prepared aluminum oxide and having the following physical-chemical characteristic data:

| | |
|---|---|
| External diameter: | 2 to 15 mm |
| BET surface area: | 60 to 115 m$^2$/g |
| Total Pore volume: | 0.30 to 0.80 ml/g |
| Crushing strength: | 100 to 300N |
| Pore size distribution: | no pores < 5 nm in diameter, at least 80% in the range 10 to 40 nm in diameter |
| Composition: | 94 to 99% by weight of Al$_2$O$_3$ remainder SiO$_2$. |

They are produced by homogenizing pyrogenically prepared aluminum oxide with kaolin and/or graphite, urea, wax, sugar or starch with addition of water, drying the mixture at a temperature of from 80° to 120° C. and comminuting it to form a powder, pressing the powder to form a molded body, and tempering the molded body by heating at a temperature of from 400° to 1200° C. for a period of 0.5 to 6 hours. The molded articles can be used as a catalyst support or catalyst.

6 Claims, No Drawings

MOLDED ARTICLES BASED ON PYROGENICALLY PREPARED ALUMINUM OXIDE AND PROCESS FOR THEIR PRODUCTION

This application is a continuation of application Ser. No. 308,124, filed on Feb. 9, 1989, now abandoned.

INTRODUCTION AND BACKGROUND

The present invention relates to molded articles on pyrogenically prepared aluminum oxide, the process for their production and their use as a catalyst support or catalyst.

Pyrogenically prepared oxides are distinguished by being extremely finely divided and by a correspondingly high specific surface area, very high purity, a spherical particle shape and the lack of pores. Due to these properties, pyrogenically prepared oxides are becoming increasingly important as supports for catalysts (D. Koth, H. Ferch, Chem. Ing. Techn. 52, 628 [1980]).

Since pyrogenically prepared oxides are particularly finely divided, shaping of the powders to form catalyst supports causes some difficulties.

German OLS 31 32 674 discloses a process for the production of molded or pressed bodies in which silica sol is used as binder.

German OLS 34 06 185 discloses a process for the production of molded bodies by using glaze frit powder as a binder and glycerol as a lubricant.

These known processes have the disadvantage that the molded bodies obtained do not have the optimum properties desired, such as, for example, adequate crushing strength, for certain catalytical reactions.

SUMMARY OF THE INVENTION

An object of the invention is to provide molded articles based on pyrogenically prepared aluminum oxide and having the following physical-chemical characteristic data:

| | |
|---|---|
| External diameter: | 2 to 15 mm |
| BET surface area: | 60 to 115 m$^2$/g |
| Total Pore volume: | 0.30 to 0.80 ml/g |
| Crushing strength: | 100 to 300N |
| Pore size distribution: | no pores < 5 nm in diameter, at least 80% of the pores in the range 10 to 40 nm in diameter |
| Composition: | 94% to 99% by weight of Al$_2$O$_3$, remainder SiO$_2$. |

The molded bodies can have various shapes, for example cylindrical, (e.g., rod) spherical or annular, (e.g., ring) with an external diameter of from 2 to 15 mm.

Another object of the invention is to provide a process for the production of molded articles based on pyrogenically prepared aluminum oxide and having the following physical-chemical characteristic data:

| | |
|---|---|
| External diameter: | 2 to 15 mm |
| BET surface area: | 60 to 115 m$^2$/g |
| Total Pore volume: | 0.30 to 0.80 ml/g |
| Crushing strength: | 100 to 300 N |
| Pore size distribution: | no pores <5 nm in diameter, at least 80% of the pores in the range 10 to 40 nm in diameter |
| Composition: | 94% to 99% by weight of Al$_2$O$_3$, remainder SiO$_2$ | which comprises homogenizing pyrogenically prepared aluminum oxide with kaolin and/or graphite, urea, wax, sugar or starch with addition of water, drying the mixture at a temperature of from 80° to 120° C. and comminuting it to form a powder, pressing the powder to form molded or pressed articles the molded articles by heating at a temperature of from 400° to 1200° C. for a period of 0.5 to 6 hours.

In a particular embodiment of the invention, the mixture can have the following composition before pressing:

50–90% by weight of aluminum oxide, preferably 60–85% by weight, 0.1–10% by weight of kaolin, preferably 1–5% by weight, and/or 0.1–10% by weight of graphite, preferably 1–5% by weight, 0.1–10% by weight of wax, preferably 1–5% by weight, 5–45% by weight of urea, preferably 8–40% by weight.

Kaolin must be employed in the process according to the invention, since otherwise the crushing strength of the molded articles is not adequate (c.f. Example 3).

In principle, all mixers or mills which enable good homogenization, such as, for example, paddle mixers, fluidized bed mixers, rotary mixers or air-stream mixers, are suitable for carrying out the process according to the invention. Mixers which additionally enable compaction of the mixing material, for example, plow blade mixers, chaser mills or ball mills, are particularly suitable. After homogenization, substantial drying at 80°–120° C. can be carried out so that a free-flowing powder is obtained after comminution. The molded articles can be produced by die stamping, eccentric pressing, extrusion or rotary pressing and in compactors.

The molded bodies are tempered by heating at 400°–1200° C. for 30 minutes to 6 hours.

By varying the amounts of starting materials and the pressing pressure, the crushing strength, the specific surface area and the pore volume can be modified within certain limits.

The molded articles according to the invention can be used either directly as catalysts or as catalyst supports by impregnating the moldings, during or after their production, with a solution of a catalytically active substance and, if appropriate, activating them by suitable aftertreatment. In a particularly advantageous manner, the molded articles according to the invention can be employed for selective hydrogenation of acetylene after treatment with palladium as catalyst. Compositions and procedures for deposition of catalytic substances onto carriers are well known in the art.

The molded bodies according to the invention have the following advantages:

High strength.

Large pore volume.

The majority of the pores are in the range from 10 to 40 nm.

No pores <5 nm.

DETAILED DESCRIPTION OF THE INVENTION

The pyrogenically prepared aluminum oxide is an aluminum oxide having the following physical-chemical characteristic data:

|  |  | $Al_2O_3$ C |
|---|---|---|
| BET surface area | $m^2/g$ | $100 \pm 15$ |
| Average size of the primary particles | nm | 20 |
| Compacted density[1] standard materials | g/l | ca. 60 |
| Loss on drying[2] (2 hours at 105° C) | % | <5 |
| Ignition loss[2][5] (2 hours at 1000° C.) | % | <3 |
| pH[3] (in 4% aqueous dispersion) |  | 4–5 |
| $SiO_2$[6] | % | <0.1 |
| $Al_2O_3$[6] | % | 99.6 |
| $Fe_2O_3$ | % | <0.2 |
| $TiO_2$[6] | % | <0.1 |
| HCl[6][8] | % | <0.5 |
| sieving residue[4] | % | <0.05 |

[1] in accordance with DIN 53 194
[2] in accordance with DIN 55 921
[3] in accordance with DIN 53 200
[4] in accordance with DIN 53 580
[5] based on the substance dried for 2 hours at 105° C.
[6] based on the substance ignited for 2 hours at 1000° C.
[8] HCl content is part of the ignition loss.

The BET surface area is determined in accordance with DIN 66 131 using nitrogen.

The pore volume is computed from the sum of the micropore, mesopore and macropore volumes.

The crushing strength is determined using a breaking tester from Ewerka Co., type TBH 28.

The micropores and mesopores are determined by recording an $N_2$ isotherm and evaluating same by the method of BET, de Boer and Barret, Joyner, Halenda.

The macropores are determined by the Hg penetration method.

EXAMPLE 1

83.3% by weight of aluminum oxide C
4.2% by weight of graphite
4.2% by weight of kaolin
8.3% by weight of urea
are homogenized in a mixer with water. The mixture obtained is dried at 100° C. and pressed through a screen of mesh size width of 1 mm.

The pressing is carried out on a rotary high-speed press (Fette Co.). The crude tablets are conditioned at 800° C. for 2 hours.

The tablets or pellets obtained have the following physical-chemical characteristic data:

| External diameter: | diameter 5 mm, height 5.9 mm |
|---|---|
| Crushing strength: | 300 N |
| Specific surface area: | 70 $m^2/g$ |
| Total Pore volume: | 0.4 ml/g |
| Pore size distribution: | no pores <5 nm in diameter, 84% of the pores in the range 10 to 40 nm in diameter |
| Composition: | 97.5% by weight of $Al_2O_3$ 2.5% by weight of $SiO_2$. |

EXAMPLE 2

63% by weight of aluminum oxide C
31% by weight of urea
3% by weight of kaolin and
3% by weight of graphite are processed as in Example 1 with addition of water to form pellets. The pellets obtained have the following physical-chemical characteristic data:

| External diameter: | 9 mm |
|---|---|
| BET surface area: | 81 $m^2/g$ |
| Total Pore volume: | 0.61 ml/g |
| Pore size distribution: | no pores <5 nm in diameter, 82% of the pores in the range 10 to 40 nm in diameter |
| Crushing strength: | 120 N |
| Composition: | 98% by weight of $Al_2O_3$ 2% by weight of $SiO_2$. |

EXAMPLE 3 (COMPARATIVE EXAMPLE)

50% by weight of aluminum oxide C
45% by weight of urea and
5% by weight of wax are processed as in Example 1 with addition of water to form pellets. The tempering is carried out by heating at 700° C.

The pellets obtained have the following physical-chemical characteristic data:

| External diameter: | 9 mm |
|---|---|
| BET surface area: | 100 $m^2/g$ |
| Total Pore volume: | 0.8 ml/g |
| Pore size distribution: | no pores <5 nm in diameter |
| Crushing strength: | 19 N |
| Composition: | 100% of $Al_2O_3$. |

Further modifications and variations of the invention will be apparent from the foregoing and are intended to be encompassed by the appended claims.

We claim:

1. A molded article based on pyrogenically prepared aluminum oxide and having the following physical-chemical characteristic data:

| External diameter: | 2 to 15 mm |
|---|---|
| BET surface area: | 60 to 115 $m^2/g$ |
| Total Pore volume: | 0.30 to 0.80 ml/g |
| Crushing strength: | 100 to 300N |
| Pore size distribution: | no pores < 5 nm in diameter, at least 80% of the pores in the range 10 to 40 nm in diameter |
| Composition: | 94% to 99% by weight of $Al_2O_3$, remainder $SiO_2$. |

2. A process for the production of a molded article based on pyrogenically prepared aluminum oxide and having the following physical-chemical characteristic data:

| External diameter: | 2 to 15 mm |
|---|---|
| BET surface area: | 60 to 115 $m^2/g$ |
| Total Pore volume: | 0.30 to 0.80 ml/g |
| Crushing strength: | 100 to 300 N (newtons) |
| Pore size distribution: | no pores <5 nm in diameter, at least 80% of the pores in the range 10 to 40 nm in diameter |
| Composition: | 94% to 99% by weight of |

Al₂O₃, remainder SiO$_2$ which comprises homogenizing 50-90% by weight of pyrogenically prepared aluminum oxide with 0.1-10% by weight of kaolin, 0.1-10% by weight of graphite, 5-45% by weight of urea, and 0.1-10% by weight of wax, with addition of water, drying the mixture at a temperature of from 80° to 120° C. and comminuting it to form a powder, pressing the powder to form a molded article, and tempering the molded article by heating at a temperature of from 400° to 1200° C. for a period of 0.5 to 6 hours.

3. A catalyst support having the composition according to claim 1 and having the shape of a pellet, rod or ring.

4. A catalyst comprising the support defined in claim 3 having deposited thereon a catalytically active substance.

5. The process according to claim 2, which comprises homogenizing 60-85% by weight pyrogenically prepared aluminum oxide with 1-5% by weight of kaolin, 1-5% by weight of graphite, 8-40% by weight of urea, and 1-5% by weight of wax.

6. The process according to claim 2, which further comprises optionally adding sugar or starch or a mixture of the two of said mixture.

* * * * *